US006683995B2

(12) United States Patent
Ford et al.

(10) Patent No.: US 6,683,995 B2
(45) Date of Patent: Jan. 27, 2004

(54) METHOD AND APPARATUS FOR CORRECTING LARGE DEFECTS IN DIGITAL IMAGES

(75) Inventors: Gordon D. Ford, Round Rock, TX (US); Leland A. Lester, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 166 days.

(21) Appl. No.: 09/735,238

(22) Filed: Dec. 12, 2000

(65) Prior Publication Data

US 2002/0071613 A1 Jun. 13, 2002

Related U.S. Application Data

(60) Provisional application No. 60/173,020, filed on Dec. 23, 1999, and provisional application No. 60/173,035, filed on Dec. 23, 1999.

(51) Int. Cl.[7] .................................................. G06T 5/00
(52) U.S. Cl. ...................................... 382/275; 382/199
(58) Field of Search ................................ 382/275, 260, 382/261, 262, 264, 199, 112; 356/237.1, 239.1, 239.7, 239.8, 237.2, 237.3

(56) References Cited

U.S. PATENT DOCUMENTS

| 4,260,899 A | 4/1981 | Baker .......................... 250/563 |
| 4,301,469 A | 11/1981 | Modeen et al. ................ 358/75 |
| 4,302,108 A | 11/1981 | Timson ........................ 356/359 |
| 4,462,860 A | 7/1984 | Szmanda ...................... 156/626 |
| 4,670,779 A | 6/1987 | Nagano .......................... 358/75 |
| 4,677,465 A | 6/1987 | Alkofer ........................ 358/80 |
| 4,680,638 A | 7/1987 | Childs ......................... 358/214 |
| 4,700,229 A | 10/1987 | Herrmann et al. ........... 358/166 |
| 4,775,238 A | 10/1988 | Weber ......................... 356/431 |
| 4,796,061 A | 1/1989 | Ikeda et al. ................... 355/73 |
| 4,845,551 A | 7/1989 | Matsumoto ................... 358/80 |
| 4,933,566 A | 6/1990 | Masaaki et al. ............. 250/563 |
| 4,937,720 A | 6/1990 | Kirchberg ..................... 363/41 |
| 4,969,045 A | 11/1990 | Haruki et al. ................ 358/228 |
| 4,972,091 A | 11/1990 | Cielo et al. .................. 250/562 |
| 4,989,973 A | 2/1991 | Noso et al. ................... 356/239 |
| 4,994,918 A | 2/1991 | Lingemann ................... 358/214 |
| 5,003,379 A | 3/1991 | Moore, Jr. et al. ............ 358/54 |
| 5,010,401 A | 4/1991 | Murakami et al. .......... 358/136 |
| 5,047,968 A | 9/1991 | Carrington et al. .......... 364/574 |
| 5,058,982 A | 10/1991 | Katzir .......................... 385/33 |
| 5,091,972 A | 2/1992 | Kwon et al. ................... 382/54 |
| 5,097,521 A | 3/1992 | Massmann .................... 382/54 |

(List continued on next page.)

FOREIGN PATENT DOCUMENTS

| DE | 28 21 868 A1 | 11/1979 | .......... G01N/21/32 |
| DE | 196 36 867 C1 | 1/1998 | ............ H04N/5/21 |
| EP | 1 547 811 | 6/1979 | ............ H04N/3/36 |
| EP | 0 422 220 A1 | 4/1991 | ............ A61B/6/03 |
| EP | 0 482 790 B1 | 4/1992 | ............ H04N/1/40 |
| EP | 0 527 097 A2 | 2/1993 | ............ H04N/1/40 |

(List continued on next page.)

OTHER PUBLICATIONS

*New Adaptive Vector Filter Based on Noise Estimate,* Mei Yu, et al., IEICE Trans Fundamentals, vol. E82, No. 6, Jun., 1999.

*A Robust Method for Parameter Estimation of Signal–Dependent Noise Models in Digital Images,* B. Aiazzi, et al., IEEE, 1997, pp. DSP 97—601–604.

(List continued on next page.)

*Primary Examiner*—Scott Rogers
(74) *Attorney, Agent, or Firm*—Dinsmore & Shohl

(57) ABSTRACT

An image processing system includes a defect correction system that identifies defective regions of a digital image using a defect map. The defect map is automatically created from an input image device. The defect correction system corrects the defective regions of the digital image using the non-defective regions of the digital image in accordance with various correction routines.

24 Claims, 4 Drawing Sheets

U.S. PATENT DOCUMENTS

| | | | | |
|---|---|---|---|---|
| 5,149,960 | A | 9/1992 | Dunne et al. | 250/226 |
| 5,155,596 | A | 10/1992 | Kurtz et al. | 358/214 |
| 5,200,817 | A | 4/1993 | Birnbaum | 358/80 |
| 5,266,805 | A | 11/1993 | Edgar | 250/330 |
| 5,267,030 | A | 11/1993 | Giorgianni et al. | 358/527 |
| 5,291,286 | A | 3/1994 | Murakami et al. | 348/469 |
| 5,311,310 | A | 5/1994 | Jozawa et al. | 348/416 |
| 5,335,086 | A | 8/1994 | Kitamura | 358/431 |
| 5,371,542 | A | 12/1994 | Pauli et al. | 348/262 |
| 5,447,811 | A | 9/1995 | Buhr et al. | 430/20 |
| 5,448,380 | A | 9/1995 | Park | 358/520 |
| 5,452,018 | A | 9/1995 | Capitant et al. | 348/651 |
| 5,465,155 | A | 11/1995 | Edgar | 385/500 |
| 5,465,163 | A | 11/1995 | Yoshihara et al. | 358/444 |
| 5,477,345 | A | 12/1995 | Tse | 358/500 |
| 5,509,086 | A | 4/1996 | Edgar et al. | 382/167 |
| 5,516,608 | A | 5/1996 | Hobbs et al. | 430/30 |
| 5,552,904 | A | 9/1996 | Ryoo et al. | 358/518 |
| 5,561,611 | A | 10/1996 | Avinash | 364/553 |
| 5,565,931 | A | 10/1996 | Girod | 348/675 |
| 5,568,270 | A | 10/1996 | Endo | 358/298 |
| 5,581,376 | A | 12/1996 | Harrington | 358/518 |
| 5,582,961 | A | 12/1996 | Giorgianni et al. | 430/508 |
| 5,583,950 | A | 12/1996 | Prokoski | 382/212 |
| 5,589,887 | A | 12/1996 | Wischermann | 348/616 |
| 5,608,547 | A | 3/1997 | Nakatani et al. | 358/505 |
| 5,641,596 | A | 6/1997 | Gray et al. | 430/21 |
| 5,666,443 | A | 9/1997 | Kumashiro | 382/266 |
| 5,673,336 | A | 9/1997 | Edgar et al. | 382/167 |
| 5,721,624 | A | 2/1998 | Kumashiro et al. | 358/450 |
| 5,726,773 | A | 3/1998 | Mehlo et al. | 358/474 |
| 5,729,631 | A | 3/1998 | Wober et al. | 382/232 |
| 5,771,107 | A | 6/1998 | Fujimoto et al. | 358/464 |
| 5,808,674 | A | 9/1998 | Adams, Jr. et al. | 348/273 |
| 5,892,595 | A | 4/1999 | Yamakawa et al. | 358/530 |
| 5,923,042 | A | 7/1999 | Mietta et al. | 250/559.06 |
| 5,930,388 | A | 7/1999 | Murakami et al. | 382/167 |
| 5,963,662 | A | 10/1999 | Vachtsevanos et al. | 382/150 |
| 5,969,372 | A | 10/1999 | Stavely et al. | 250/559.42 |
| 5,979,011 | A | 11/1999 | Mivawaki et al. | 15/308 |
| 5,982,941 | A | 11/1999 | Loveridge et al. | 382/260 |
| 5,982,951 | A | 11/1999 | Katayama et al. | 382/284 |
| 5,991,444 | A | 11/1999 | Burt et al. | 382/232 |
| 6,005,987 | A | 12/1999 | Nakamura et al. | 382/294 |
| 6,057,040 | A | 5/2000 | Hage | 428/447 |
| 6,075,905 | A | 6/2000 | Herman et al. | 382/284 |
| 6,078,051 | A | 6/2000 | Banton et al. | 250/341.1 |
| 6,078,701 | A | 6/2000 | Hsu et al. | 382/294 |
| 6,101,273 | A | 8/2000 | Matama | 382/169 |
| 6,128,416 | A | 10/2000 | Oura | 382/284 |
| 6,239,886 | B1 | 5/2001 | Klasser et al. | 358/518 |

FOREIGN PATENT DOCUMENTS

| | | | | |
|---|---|---|---|---|
| EP | 0 569 142 A1 | 11/1993 | | H04N/5/253 |
| EP | 0 624 848 A2 | 11/1994 | | G06F/15/68 |
| EP | 0 699 753 A2 | 8/1995 | | H04N/1/407 |
| EP | 0 716 538 A2 | 6/1996 | | H04N/1/50 |
| EP | 768 621 A2 * | 10/1996 | | G06T/5/20 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |
| EP | 0 816 833 A3 | 8/1998 | | G01N/21/88 |
| EP | 0 893 914 A2 | 10/1999 | | H04N/5/253 |
| GB | 2 283 633 A | 5/1995 | | H04N/5/262 |
| JP | 4-291139 | 10/1992 | | G01N/21/89 |
| JP | 11185028 | 7/1999 | | G06T/1/00 |
| JP | 2000-13604 | 1/2000 | | H04N/1/409 |
| JP | 2000-196813 A | 7/2000 | | |
| WO | WO 84/02019 | 5/1984 | | G06F/15/20 |
| WO | WO 89/06890 | 7/1989 | | H04N/3/36 |
| WO | WO 90/01240 | 2/1990 | | H04N/1/40 |
| WO | WO 91/09493 | 6/1991 | | H04N/5/127 |
| WO | WO 92/05469 | 4/1992 | | G03B/27/53 |
| WO | WO 95/15530 | 6/1995 | | G06F/17/14 |
| WO | WO 97/16028 | 5/1997 | | H04N/7/30 |
| WO | WO 98/31142 | 7/1998 | | H04N/5/253 |
| WO | WO 98/34397 | 8/1998 | | |
| WO | WO 99/40729 | 8/1999 | | H04N/9/11 |
| WO | WO 01/48694 | 7/2001 | | G06F/5/00 |

OTHER PUBLICATIONS

*A Regularized Iterative Image Restoration Algorithm,* Aggelos K. Katsaggelos, et al. IEEE, 1991, pp. 914–929.

*Adaptive Fourier Threshold Filtering: A Method to Reduce Noise and Incoherent Artifacts in High Resolution Cardiac Images,* M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement,* Til Aach, et al., IEEE, 1996, pp. 335–338.

*Adaptive–neighborhood filtering of images corrupted by signal–dependent noise,* Rangaraj M. Rangayyan et al., Applied Optics, vol. 37, No. 20, Jul. 10, 1998, pp. 4477–4487.

*Grayscale Characteristics,* Photographic Negatives The Nature of Color Images, pp. 163–168.

*Digital Imaging Equipment White Papers,* Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG,* Gil Aharoni, et al., Journal of Mathematical Imaging and Vision, 3, 7–38, 1993.

*Digital ICE,* Applied Science Fiction, Inc., http://www.asf.com/html/o‾products/iceprod.html. Aug. 5, 1999.

*About Digital ICE Technology,* Applied Science Fiction, Inc., http://www.asf.com/html/o‾products/icetech.html. Aug. 5, 1999.

*2–D Adaptive Volterra Filter for 2–D Nonlinear Channel Equalisation and Image Restoration,* J.N. Lin, et al., Electronic Letters, vol. 28, No. 2, Jan. 16, 1992, pp. 180–182.

* cited by examiner

METHOD AND APPARATUS FOR CORRECTING LARGE DEFECTS IN DIGITAL IMAGES

RELATED APPLICATIONS

This application claims priority under 35 U.S.C. §119(e) of U.S. Provisional Patent Application Ser. No. 60/173,020, filed on Dec. 23, 1999 entitled "Method to Correct Large Defects in Digital Images by Healing Across Defective Pixels," and U.S. Provisional Patent Application Ser. No. 60/173,035, filed on Dec. 23, 1999 entitled "Method and Apparatus for Correcting Large Defects in Digital Images by Stretching Across Defective Pixels."

FIELD OF THE INVENTION

The present invention relates to image processing and, particularly, to a method and apparatus for correcting large defects in digital images.

DESCRIPTION OF THE RELATED ART

Digitized images are used extensively in modern society to facilitate the communication of information and ideas through pictures. Print and film photos, documents and the like are often digitized to produce a digital image that can then be viewed, communicated, enhanced, modified, printed or stored. The increasing use of digital images has led to a rising demand for improved systems and methods for the digitization of images.

Digitized images often include imperfections that are not present in the original image. One cause of such defects is the components of the image capturing system. For example, in a scanner, the scanning surface, or platen, may contain scratches and other optical path obstructions. These optical path obstructions are digitized along with the image and appear as imperfections in the digitized image. Another cause of imperfections is defects within the physical medium of the image. For example, a photograph, film negative, or other physical medium may be scratched or deformed despite careful handling. In addition, dust, hair, smudges, and the like may be deposited on the surface of the physical medium and will be digitized along with the image. These objects will also appear in the digitized image as imperfections in the digitized image.

One method for correcting defects in the image involves the use of a defect map, wherein each pixel has a defect value proportional to the severity of the defect in the pixel. Each pixel is corrected based on its own defect value. This is generally accomplished by dividing-out the defect value from the pixel value. Another method for correcting defects in the image is to replace the defective pixel with a replacement value determined from the surrounding defective and non-defective pixels within a predetermined area. This interpolated value is then used to "fill" the defective pixel.

After such automatic image correcting systems have been run, there may remain certain large defects that conventional correction systems do not adequately correct. Such defects may, for example, be the result of a hole in the image media or a scratch that penetrates the image media layers. In these cases, there is generally insufficient data with which to reconstruct the pixel data.

SUMMARY OF THE INVENTION

Accordingly, a need has arisen in the art for a method and system for correcting large defects in digital image. The present invention provides a system and method for correcting large defects in digital images.

In accordance with one implementation, an image correction system is provided. In this implementation, the image correction system includes an image input device that operates to produce a digital image and a defect map. The defect map allows the identification of defective and non-defective regions of the digital image. A defect correction program and at least one correction routine is used to correct the defective region of the digital image. Examples of correction routines include a reference line correction routine, a fill correction routine, and an average correction routine. Examples of different types of reference lines used in reference line routines include feature lines, centerlines, contour lines, and user defined reference lines.

In another implementation, a defect correction program is provided. In this implementation, the defect correction program operates to receive a digital image and a corresponding defect map. As discussed above, the defect map identifies at least one defective region and a non-defective region of the digital image. The defect correction program then corrects the defective region using at least one correction routine.

BRIEF DESCRIPTION OF THE DRAWINGS

A better understanding of the invention is obtained when the following detailed description is considered in conjunction with the following drawings, in which like reference numerals represent like features, in which.

DETAILED DESCRIPTION OF THE INVENTION

FIGS. 1 through 4 illustrate an image defect correcting system and method. As will be discussed in greater detail below, an image defect correcting system according to the present invention uses a defect map that identifies defective regions in a digital image to correct the defective regions in the digital image using the non-defective regions of the digital image. This results in an improved digital image having fewer noticeable defective regions.

Figure 1:
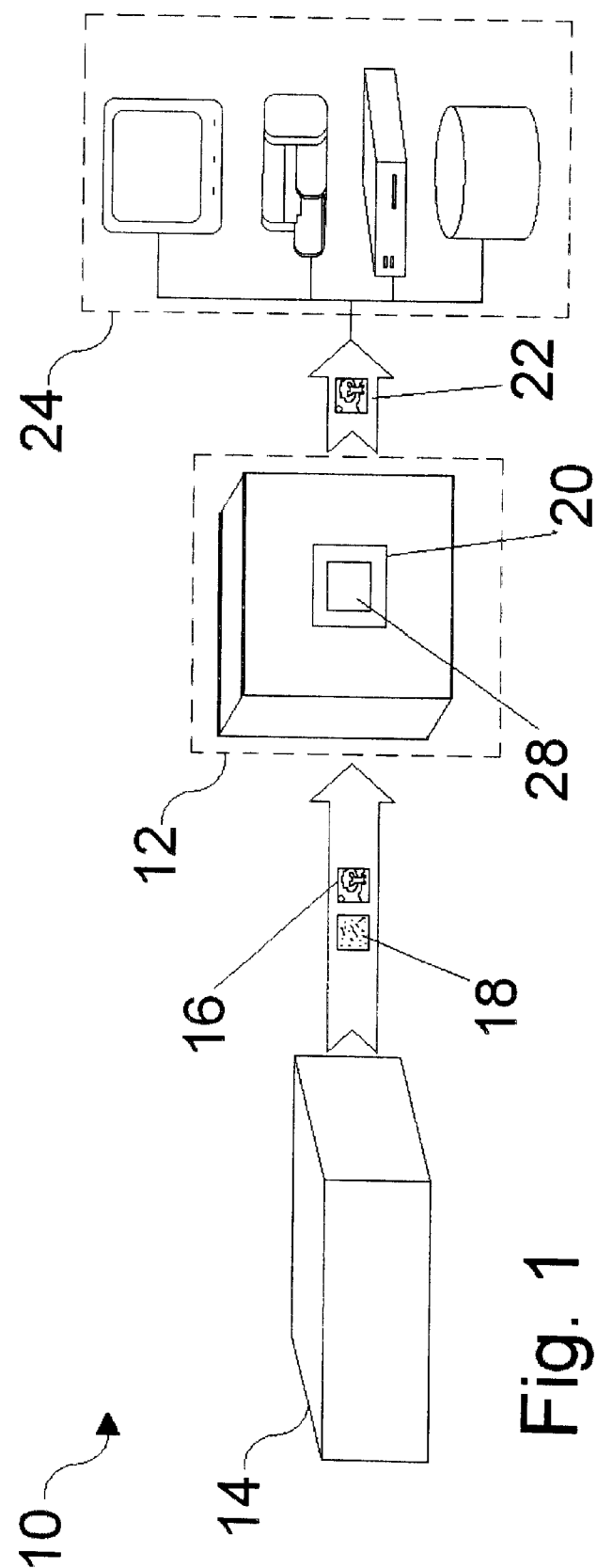
FIG. 1 is a block diagram of an image correction system in accordance with the present invention.

FIG. 1 illustrates one embodiment of an image correction system 10 in accordance with the present invention. In this embodiment, the image correction system 10 comprises a data processing system 12 and an image input device 14. As described in greater detail below, the image input device 14 communicates a digital image 16 and a defect map 18 to the data processing system 12. The data processing system 12 operates to process the digital image 16 and the defect map 18 according to a defect correction program 20 to correct any defects in the digital image 16. The resulting improved digital image 22 may then be output from the data processing system 12 to an output device 24.

The data processing system 12 generally comprises a computer system, such as an IBM RS 6000 workstation, an IBM PC or PC-compatible computer, an Apple G4 computer, and the like. The data processing system 12 can be loaded with the defect correction program 20 to process the digital image 16 and defect map 18.

The image input device 14 comprises any suitable device operable to produce the digital image 16. In the preferred embodiment, the image input device 14 also operates to automatically produce the defect map 18. In one embodiment, the image input device 14 comprises a film scanner. In this embodiment, one method for generating the digital image 16 comprises transmitting light in the visible portion of the electromagnetic spectrum through a film negative or positive (not expressly shown) and using a sensor (not expressly shown) to record color data relating to the intensity of red, green, and blue light for each location of the film. In addition to capturing color data, the visible light scan also records defective regions as part of the digital image. One method for generating the defect map 18 is described in U.S. Pat. No. 5,266,805, entitled *System and Method for Image Recovery* which is hereby incorporated by reference in its entirety as if fully set forth herein. This method transmits infrared light through the film. Color dyes within the film are transparent to infrared light and the sensor records the defect map 18. Specifically, defects in the film media and the system are identified because they substantially reduce or totally occlude the infrared light transmitted through the film. The resulting digitized image provides an accurate defect map 18 of the location and shape of defective regions.

In another embodiment, the image input device 14 comprises a flatbed scanner. In general, flatbed scanners reflect light from a document, such as a photographic print, to a sensor that records color data corresponding to each discrete location on the document. The color data forms the digital image 16. As described previously, the scanning operation also records defects in the document media and system, such as scratches in a platen (not expressly shown). One method for generating the defect map 18 is described in U.S. patent application Ser. No. _____, entitled *Method and Apparatus for Differential Illumination Image Capturing and Defect Handling*, having a priority filing date of Oct. 8, 1999. In this method, light from two different angles is used to detect defects in the document and the system. In overly simple terms, defects in the document and system create a pattern of shadows when light is shined on the document at a first angle. Light from a second angle produces a different pattern of shadows. Comparison of the two views allows defective regions to be identified and produces the defect map 18.

Other suitable software programs can be utilized in concert with the defect correction program 20 to automatically create the defect map 18. For example, the defect map 18 could be created automatically by detecting variations in the pixel data values that do not correspond with the content of the digital image 16.

The defect correction program 20 operates to identify defective regions within the digital image 16 using the defect map 18. In many applications, the defect correction program 20 is secondary to a conventional image correction program that corrects relatively small defects using data from the defective pixel, such as described in U.S. Pat. No. 5,266,805. In these applications, the defect correction program 20 is generally used to correct relatively large defects that are not adequately corrected using conventional techniques.

The defect correction program 20 incorporates one or more correction routines 28 that operate to correct the defective region using non-defective regions of the digital image 16. Specific examples of correction routines 28 are illustrated in FIGS. 2 through 4. It will be understood that the non-defective regions used in the correction routines 28 may include pixels corrected using conventional image correction techniques.

The defect correction program 20 is generally loaded into the data processing system 12. In one embodiment, the defect correction program 20 forms a part of the image input device 14. In particular, the image input device 14 includes a user interface (not expressly shown), often referred to in the art as a TWAIN, that allows the data processing system 12 to operate with the image input device 14. In this embodiment, the defect correction program 20 is incorporated into the user interface. In another embodiment, the defect correction program 20 is a stand-alone program operable to be loaded into the data processing system 12. In this embodiment, the defect correction program 20 may operate independently using the digital image 16 and defect map 18, or be integrated into an existing user interface for the image input device 14.

Output device 24 may comprise any type or combination of suitable devices for displaying, storing, printing, transmitting or otherwise receiving the improved digital image 22. For example, as illustrated, output device 24 may comprise a monitor, printer, network system, mass storage device, or any other suitable output device. The network system may be any network system, such as the Internet, a local area network, and the like. Mass storage device may be a magnetic or optical storage device, such as a floppy drive, hard drive, removable hard drive, optical drive, CD-ROM drive, and the like.

Figure 2A:
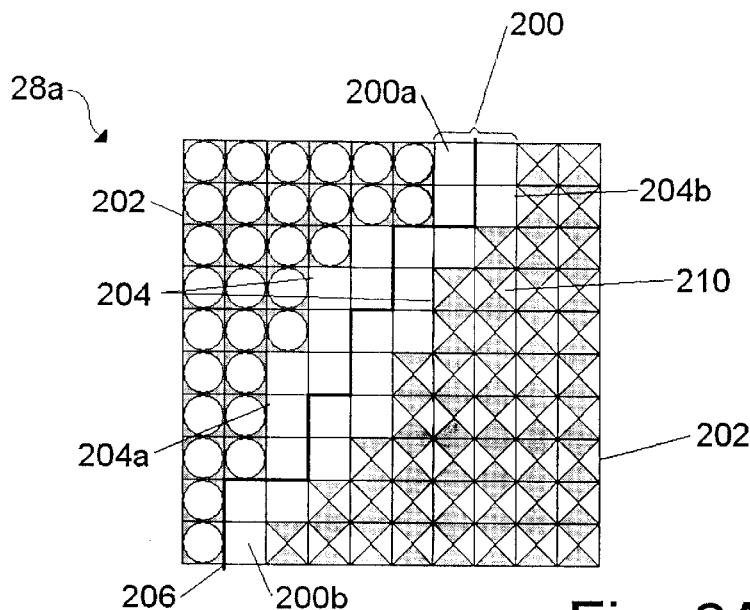
FIGS. 2A–2B are diagrams illustrating the operation of a reference line correction routine in accordance with the present invention.

FIGS. 2 through 4 illustrate various examples of correction routines 28. The defect correction program 20 identifies a defective region 200 and a non-defective region 202 of the digital image 16 using the defect map 18. The defective region 200 and non-defective region 202 are made up of individual pixels 210. FIG. 2A illustrates a reference line correction routine 28a. In this embodiment, the reference line correction routine 28a identifies a boundary 204 that defines the edge of the defective region 200 with the non-defective region 202. One or more reference lines 206 are calculated through the defective region 200. As illustrated, the reference line 206 divides the defective region 200 into a first defective region 200a and a second defective region 200b, with a first boundary 204a and a second boundary 204b, respectively. Additional defective regions 200x and boundaries 204x would be defined if additional reference lines 206 are defined.

In one embodiment, as illustrated in FIG. 2A, the reference line 206 comprises a centerline through the defective region 200. In one application, the centerline is calculated based on a best-fit line through the defective region 200. In other applications, the centerline is based on an average or general shape of the defect region 200. For example, if the general shape of the defective region 200 is substantially rectangular, the centerline can be calculated as the long axis of the rectangle.

In another embodiment, the reference line 206 comprises a feature line. In this embodiment, certain continuous features in the digital image 16 that are interrupted by the defective region 200 can be identified. The continuous feature can be identified in the non-defective region 202 surrounding the defective region 200. One or more feature lines can be calculated to form a continuous feature through the defective region 200. For example, assume the digital image 16 is an image of a leaf and the defective region 200 covers the edge of the leaf against a blue sky, the edge of the leaf on each side of the defective region 200 can be easily identified. A feature line can be calculated between the points where the edge of the leaf contacts the defective region 200. The approximation for the feature line can be further improved using interpolation techniques such as cubic spline techniques, or additional feature lines such as secondary feature lines that identify additional or secondary features in the digital image 16. As described further in FIG. 2B, the defective region 200 on each side of the feature line can then be filled with pixel data values representing the sky on one side and the leaf on the other side.

According to another embodiment, the reference line 206 comprises a user defined reference line. In this embodiment, the user interface (not expressly shown) allows the user to interact with the correction routine 28a and define one or more user defined reference lines within the defect region 200. In some embodiments, the user can also select the pixels to be used to fill the various regions created by the user defined reference lines. In other embodiments, the user can select the region or pixels used to interpolate the color data values. For example, assuming the same digital image 16 of a leaf against a blue sky with a defective region 18 extending through the edge of the leaf and the veins of the leaf. According to one implementation, the user can define a user defined reference line representative of the edge of the leaf. In addition, the user can define reference lines representative of the veins of the leaf. As described further in FIG. 2B, the defective regions 200 defined by the user defined reference lines can then be filled with data color values associated with the respective non-defective regions 202.

In yet another embodiment, the reference line 206 comprises a contour line. In this embodiment, the variations in the pixel data values of the non-defective region 202 proximate the defective region 200 can be matched. This technique is somewhat similar to contour line maps. By matching the variations, the pixel data values in the defective region 200 can be approximated.

Although several examples of reference lines 206 have been described, other suitable reference line techniques may be used without departing from the scope of the present invention.

Figure 2B:
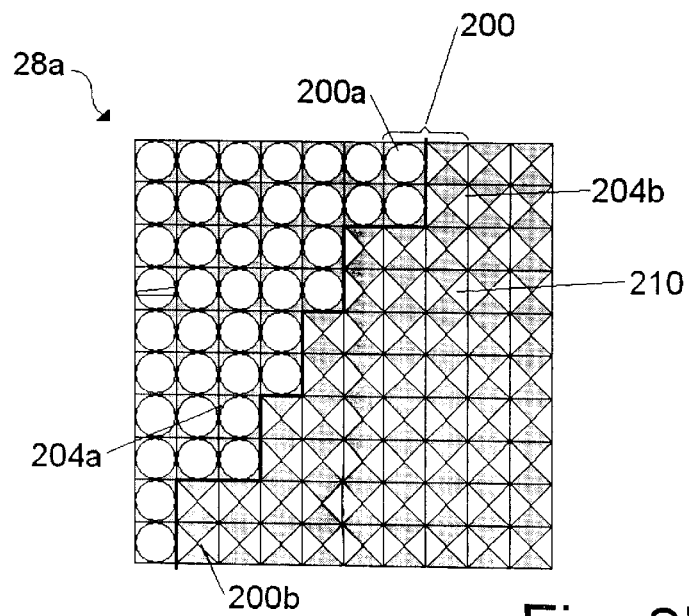

FIG. 2B illustrates the diagram of FIG. 2A as filled-in in accordance with one embodiment of the present invention. As illustrated, non-defective pixels 210 associated with the first boundary 204a are used to replace the pixels 210 in the first defective region 200a and non-defective pixels 210 associated with the second boundary 204b are used to replace the second defective region 200b. In a particular embodiment, the pixels 210 used to fill the defective region 200 are adjacent the respective boundaries 204a and 204b. The specific pixel data values used to fill the defective regions 200a and 200b can be calculated by direct replacement, interpolation, or any other suitable method for approximating the correct replacement pixel data value.

Figure 3A:
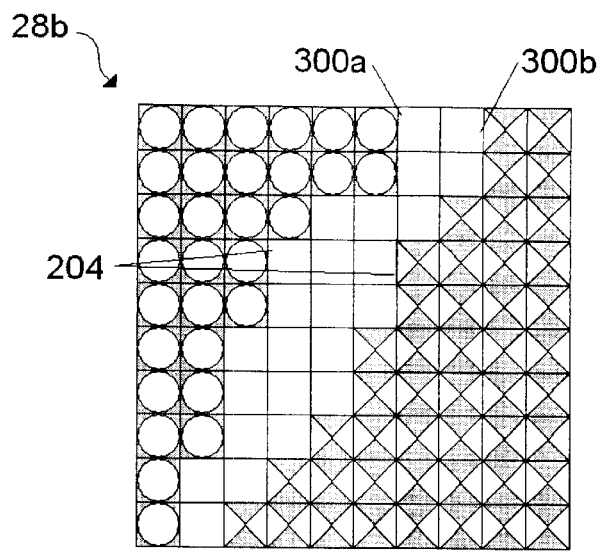
FIGS. 3A–3B are diagrams illustrating the operation of a fill correction routine in accordance with the present invention.
Figure 3B:
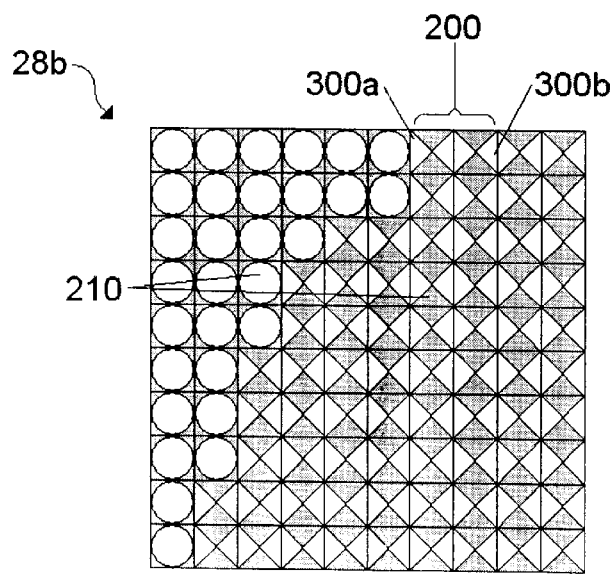

FIG. 3A illustrates one embodiment of a fill correction routine 28b. In this embodiment, a first edge 300a and a second edge 300b are defined as portions of the boundary 204. As illustrated in FIG. 3B, the pixels 210 proximate the first edge 300a are not used to fill the defect region 200; whereas, the pixels 210 proximate the second edge 300b supplied color data values used to fill the defect region 200. Multiple methods may be used to calculate the color data values used to fill the defect region 200, as described previously.

Figure 4A:
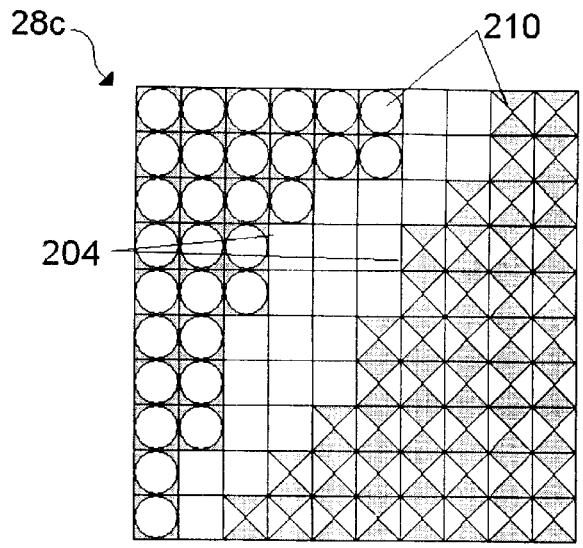
FIGS. 4A–4B are diagrams illustrating the operation of an average correction routine in accordance with the present invention.
Figure 4B:
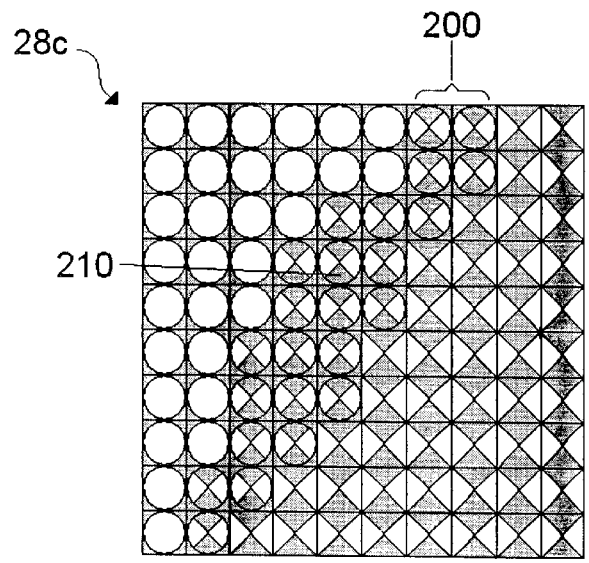

FIG. 4A illustrates one embodiment of an average correction routine 28c. In this embodiment, the data values associated with pixels 210 forming or proximate the boundary 204 are averaged. As illustrated in FIG. 4B, the averaged data values are then used as the data values for the pixels 210 forming the defective region 200.

The invention described herein generally operates to correct defective regions identified using a defect map. The resulting improved digital image is more pleasing to a user. Many conventional correction programs do not utilize a defect map, and those correction programs that do utilize a defect map use data from the defective pixels to calculate the correction data for that pixel.

The invention described in the above detailed description is not intended to be limited to the specific form set forth herein, but is intended to cover such alternatives, modifications and equivalents as can reasonably be included within the spirit and scope of the appended claims. To aid the Patent Office and any readers of any patent issued on this application in interpreting the claims appended hereto, applicants wish to note that they do not intend any of the appended claims to invoke paragraph 6 of 35 U.S.C. Sec. 112 as it exists on the date of filing hereof unless the words "means for" or "step for" are used in the particular claim.

What is claimed is:

1. An image correction system comprising:
   an image input device operable to produce a digital image and a defect map, wherein the defect map allows the identification of defective and non-defective regions of the digital image; and
   a defect correction program having at least one correction routine operable to substantially correct the defective regions of the digital image using the non-defective regions of the digital image to produce an improved digital image, wherein the at least one correction routine comprises a reference line correction routine operable to define boundaries between defective and non-defective regions as a function of an orientation of the defective region.

2. The image correction system of claim 1, wherein the reference line correction routine includes a feature line.

3. The image correction system of claim 1, wherein the reference line correction routine includes a centerline.

4. The image correction system of claim 1, wherein the reference line correction routine includes a contour line.

5. The image correction system of claim 1, wherein the reference line correction routine includes a user defined reference line.

6. The image correction system of claim 1, wherein the at least one defect correction program includes a fill correction routine.

7. The image correction system of claim 1, wherein the at least one defect correction program includes an average correction routine.

8. The image correction system of claim 1, wherein the at least one defect correction program is incorporated into a user interface of the image input device.

9. The image correction system of claim 1, further comprising an output device operable to receive the improved digital image.

10. The image correction system of claim 1, wherein the image input device comprises a film scanner.

11. The image correction system of claim 1, wherein the image input device comprises a flatbed scanner.

12. A defect correction program operable to:
    receive a digital image and a corresponding defect map, wherein the defect map identifies at least one defective region of the digital image and a non-defective region of the digital image; and
    correct the at least one defective region using at least one correction routine, wherein the correction routine comprises a reference line correction routine operable to define boundaries between defective and non-defective regions as a function of an orientation of the defective region.

13. The defect correction program of claim 12, wherein the reference line correction routine includes a feature line.

14. The defect correction program of claim 12, wherein the reference line correction routine includes a centerline.

15. The defect correction program of claim 12, wherein the reference line correction routine includes a contour line.

16. The defect correction program of claim 12, wherein the reference line correction routine includes a user defined reference line.

17. The defect correction program of claim 12, wherein the at least one defect correction program includes a fill correction routine.

18. The defect correction program of claim 12, wherein the at least one defect correction program includes an average correction routine.

19. A method for correcting an image, comprising:

determining at least one defective region and an associated non-defective region using a defect map;

parsing the at least one defective region into sub-regions using at least one reference line operable to define boundaries between the at least one defective region and the non-defective region as a function of an orientation of the at least one defective region; and filling the sub-regions using data calculated from the non-defective regions associated with the sub-regions.

20. The method of claim 19, wherein the at least one reference line comprises a feature line.

21. The method of claim 19, wherein the at least one reference line comprises a contour line.

22. The method of claim 19, wherein the at least one reference line comprises a user defined reference line.

23. The method of claim 19, wherein filling the sub-regions using data calculated from the non-defective regions comprises filling the sub-regions using data calculated by interpolation from the non-defective regions associated with the sub-regions.

24. The method of claim 23, wherein the interpolation comprises a straight-line interpolation.

* * * * *